US011898689B2

(12) United States Patent
Kunii

(10) Patent No.: US 11,898,689 B2
(45) Date of Patent: Feb. 13, 2024

(54) ANGLE ADJUSTMENT MECHANISM, DESKTOP APPARATUS, AND METHOD FOR ASSEMBLING ANGLE ADJUSTMENT MECHANISM

(71) Applicant: NEC Platforms, Ltd., Kawasaki (JP)

(72) Inventor: Masaru Kunii, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 165 days.

(21) Appl. No.: 17/640,438

(22) PCT Filed: Jul. 20, 2020

(86) PCT No.: PCT/JP2020/028012
§ 371 (c)(1),
(2) Date: Mar. 4, 2022

(87) PCT Pub. No.: WO2021/049173
PCT Pub. Date: Mar. 18, 2021

(65) Prior Publication Data
US 2022/0325846 A1 Oct. 13, 2022

(30) Foreign Application Priority Data

Sep. 12, 2019 (JP) ................................ 2019-166021

(51) Int. Cl.
*F16M 11/10* (2006.01)
*H04M 1/02* (2006.01)
*H04M 1/12* (2006.01)

(52) U.S. Cl.
CPC .......... *F16M 11/10* (2013.01); *H04M 1/0295* (2013.01); *H04M 1/12* (2013.01)

(58) Field of Classification Search
CPC ........ H04M 1/0295; H04M 1/12; H04M 1/02; F16M 11/10; F16C 11/04; F16C 11/10; G06F 1/1679
See application file for complete search history.

(56) References Cited

U.S. PATENT DOCUMENTS

2002/0088918 A1\* 7/2002 Uto ...................... G01D 11/30
248/688
2003/0061684 A1\* 4/2003 Tanaka ................... F16M 11/10
16/337
(Continued)

FOREIGN PATENT DOCUMENTS

CN 107483665 A 12/2017
JP 2000-221896 A 8/2000
(Continued)

OTHER PUBLICATIONS

EP Office Communication for EP Application No. EP20863596.1 dated Sep. 9, 2022.
(Continued)

*Primary Examiner* — Tuan D Nguyen
(74) *Attorney, Agent, or Firm* — Sughrue Mion, PLLC

(57) ABSTRACT

An angle adjustment mechanism capable of achieving stable quality is provided. An angle adjustment mechanism (10) includes a base member (20), a support member (40) that supports the base member (20) from below, a mount member (30) having a rotation shaft (16) rotatably connecting the base member (20), and a suppression member (50). The support member (40) moves up and down in conjunction with a rotation operation of the base member (20). The suppression member (50) is formed of an elastic material and attached to the mount member (30), and suppresses up-and-down movement of the support member (40) by frictional force. The suppression member (50) is provided with a hole (52) into which a part of the support member is inserted and slides, and frictional force is generated between the suppression member (50) and the support member (40) in the hole (52).

20 Claims, 12 Drawing Sheets

(56) References Cited

U.S. PATENT DOCUMENTS

2003/0189155 A1    10/2003  Serbinski et al.
2008/0267389 A1*   10/2008  Nitobe ................... F16M 11/10
                                                              379/328

FOREIGN PATENT DOCUMENTS

| JP | 2005-077573 A | 3/2005 |
| JP | 2005-101246 A | 4/2005 |
| JP |     3117629 U | 1/2006 |

OTHER PUBLICATIONS

International Search Report for PCT Application No. PCT/JP2020/028012, dated Sep. 8, 2020.
JP Office Action for JP Application No. 2019-166021, dated Sep. 1, 2020 with English Translation.

* cited by examiner

ANGLE ADJUSTMENT MECHANISM, DESKTOP APPARATUS, AND METHOD FOR ASSEMBLING ANGLE ADJUSTMENT MECHANISM

This application is a National Stage Entry of PCT/JP2020/028012 filed on Jul. 20, 2020, which claims priority from Japanese Patent Application 2019-166021 filed on Sep. 12, 2019, the contents of all of which are incorporated herein by reference, in their entirety.

TECHNICAL FIELD

The present invention relates to an angle adjustment mechanism, a desktop apparatus, and a method for assembling the angle adjustment mechanism.

BACKGROUND ART

Patent Literature 1 discloses an electronic apparatus having a display unit rotatably connected to an electronic apparatus main body by a rotation shaft. The electronic apparatus includes a display unit, a sliding unit for maintaining an angle of the display unit, and a friction unit that acquires frictional force by pressing into contact with the sliding unit. The friction unit is formed of a material having elastic force, and is disposed in such a way as to press into contact with a sliding surface formed on the sliding unit and maintain the angle of the display unit by the frictional force.

CITATION LIST

Patent Literature

[Patent Literature 1] Japanese Utility Model No. 3117629

SUMMARY OF INVENTION

Technical Problem

In a structure of the electronic apparatus according to Patent Literature 1, repulsive force of the friction unit is applied to the sliding unit and a cover to which the friction unit is attached. As a result, a load due to the repulsive force of the friction unit is transmitted to the rotation shaft. Herein, since a diameter of the rotation shaft is generally small, rigidity is weak. Therefore, the rotation shaft may be deformed by the repulsive force of the friction unit. As described above, in the structure of the electronic apparatus according to Patent Literature 1, the repulsive force of the friction unit may affect surrounding components. Therefore, in the structure of the electronic apparatus according to Patent Literature 1, quality may not be stable.

An object of the present disclosure is made in order to solve such a problem and is to provide an angle adjustment mechanism, a desktop apparatus, and a method for assembling the angle adjustment mechanism that are capable of achieving stable quality.

Solution to Problem

An angle adjustment mechanism according to the present disclosure includes: a base member to which a display device is attached; a support member that supports the base member from below and moves up and down in conjunction with a rotation operation of the base member; a mount member that has a rotation shaft that rotatably connects the base member; and a suppression member that suppresses up-and-down movement of the support member by frictional force, the suppression member being formed of an elastic material and attached to the mount member, wherein the suppression member is provided with a hole into which a part of the support member is inserted, then in the hole, the frictional force is generated between the suppression member and the support member, and the support member is configured in such a way as to move up and down by sliding through a hole provided in the suppression member in association with a rotation operation of the base member, and stop the movement by the frictional force when the rotation operation of the base member stops.

A desktop apparatus according to the present disclosure includes an apparatus main body, a display device, and an angle adjustment mechanism that adjusts an angle of the display device, wherein the angle adjustment mechanism includes: a base member to which the display device is attached; a support member that supports the base member from below and moves up and down in conjunction with a rotation operation of the base member; a mount member that is attached to the apparatus main body and has a rotation shaft that rotatably connects the base member; and a suppression member that suppresses up-and-down movement of the support member by frictional force, the suppression member being formed of an elastic material and attached to the mount member, the suppression member is provided with a hole into which a part of the support member is inserted then in the hole, the frictional force is generated between the suppression member and the support member, and the support member is configured to move up and down by sliding a hole provided in the suppression member in association with a rotation operation of the base member and stop movement by the frictional force when the rotation operation of the base member stops.

A method for assembling an angle adjustment mechanism according to the present disclosure includes: attaching, to a mount member that has a rotation shaft rotatably connecting a base member to which a display device is attached, a suppression member that suppresses up-and-down movement of a support member by frictional force and that is formed of an elastic member, the support member supporting the base member from below and moving up and down in conjunction with a rotation operation of the base member; inserting a part of the support member into a hole provided in the suppression member; assembling the base member to the mount member; and fixing the display device to the base member.

Advantageous Effects of Invention

According to the present disclosure, it is possible to provide an angle adjustment mechanism, a desktop apparatus, and a method for assembling the angle adjustment mechanism that are able to achieve stable quality.

DESCRIPTION OF EMBODIMENTS

Prior to description of an example embodiment of the present disclosure, an outline of the example embodiment according to the present disclosure will be described. First, a desktop apparatus having an angle adjustment mechanism capable of adjusting an angle of a display device will be described.

Figure 1:
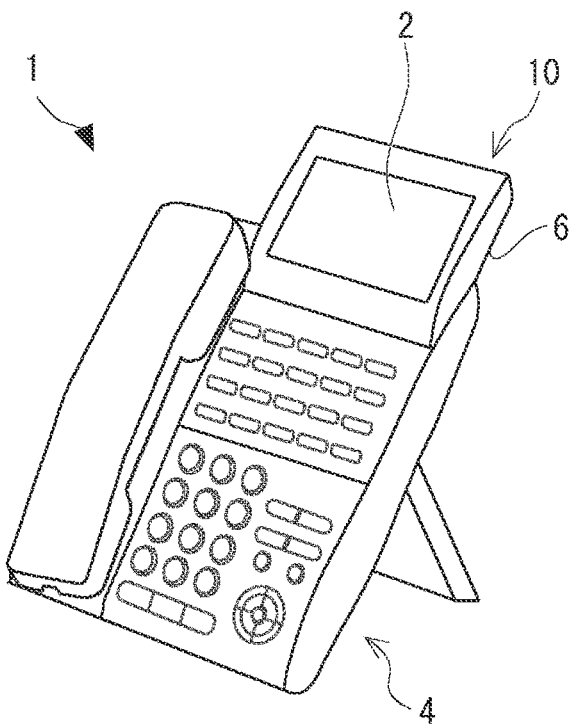
FIG. 1 is a diagram illustrating a desktop apparatus.

FIG. 1 is a diagram illustrating a desktop apparatus 1. The desktop apparatus 1 includes a display device 2 such as a liquid crystal display (LCD), an apparatus main body 4, and an angle adjustment mechanism 10. The angle adjustment mechanism 10 includes a base member 6 to which the display device 2 is attached.

The angle adjustment mechanism 10 can adjust an angle (a tilt angle) of the display device 2 with respect to the apparatus main body 4. The angle adjustment mechanism 10 has a so-called free stop function in which the angle is adjusted steplessly. With this free stop function, a user manually adjusts the display device 2 at an optional angle, and the display device 2 is held at that angle. Specifically, the user can manually rotate the base member 6 to which the display device 2 is attached. When the user stops his/her hand, the display device 2 (base member 6) is configured to rest at an angle (inclination) at that time.

Herein, a torque hinge is generally used as a mechanism of adjusting the angle of the display device 2. However, the torque hinge is expensive. Also, an assembly of the torque hinge is labor-intensive. Therefore, a method that does not employ a torque hinge as the angle adjustment mechanism is also desired.

Next, an example of a method of achieving a free stop function without using a torque hinge for the purpose of weight reduction and cost reduction will be briefly described. When the display device 2 (base member 6) rotates with respect to the apparatus main body 4, the base member 6 and a member (a mount member to be described later) on a side of the apparatus main body 4 slide. By putting in a silicon rubber member on the sliding surface and compressing the silicon rubber member, frictional force is generated between the silicon rubber member and the base member 6. The user can manually rotate the display device 2 (base member 6) against the frictional force. When the user stops his/her hand, the display device 2 (base member 6) rests due to the frictional force described above.

When the silicon rubber member is compressed in this manner, elastic force (repulsive force) that causes the silicon rubber member to return to its original shape is generated in the silicon rubber member. This force generates repulsive force that tends to separate from each other between the base member 6 and the member on the side of the apparatus main body 4. As a result, a load may be applied to surrounding components (mold components) of the silicon rubber member.

Therefore, there is a risk that a portion having weak rigidity, such as a rotation shaft that allows the base member 6 to rotate, may be deformed. Further, force (rotational force) that causes the display device 2 (base member 6) to rotate may vary, and the user may not be able to perform angle adjustment successfully. As described above, in the method of putting in the silicon rubber member on the sliding surface, the frictional force for maintaining the angle of the display device affects the surrounding components, and therefore the quality may not be stabilized.

On the other hand, as will be described later, the angle adjustment mechanism according to the present disclosure includes a base member, a support member that supports the base member from below, a mount member having a rotation shaft rotatably connecting the base member, and a suppression member. The support member moves up and down in conjunction with a rotation operation (tilt operation) of the base member. The suppression member is formed of an elastic material and is attached to the mount member, and suppresses up-and-down movement of the support member by frictional force. The suppression member is provided with a hole into which a part of the support member is inserted and slides, and frictional force is generated between the suppression member and the support member in this hole. The support member is configured to move up and down by sliding a hole provided in the suppression member in accordance with the rotation operation of the base member and to stop the movement by frictional force when the rotation operation of the base member stops.

With such a configuration, an influence of the frictional force by the suppression member is exerted only on the support member and the influence on the surrounding components is suppressed. Therefore, the angle adjustment mechanism according to the present disclosure can suppress the influence of the frictional force for maintaining the angle of the display device on the surrounding components by the above-described configuration. Further, since the torque hinge is not used, the structure is simple and a manufacturing cost can be suppressed. Thus, the angle adjustment mechanism according to the present disclosure can achieve stable quality with a simple structure.

First Example Embodiment

An example embodiment will be described below with reference to the drawings. For clarity of explanation, the following description and drawings are appropriately omitted and simplified. In the drawings, the same elements are denoted by the same reference numerals, and a repetitive description thereof is omitted as necessary.

Figure 2:
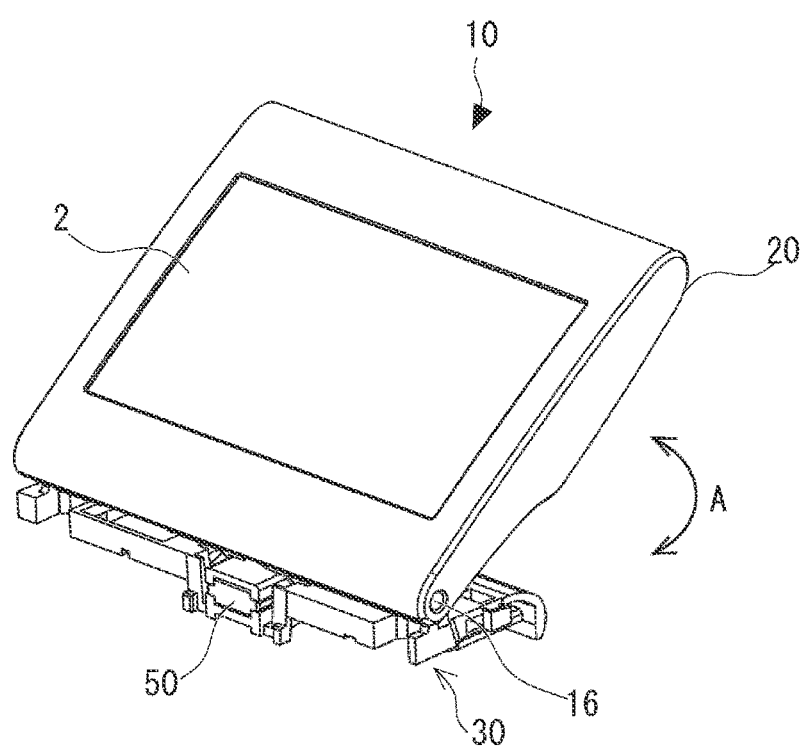
FIG. 2 is a perspective diagram of an angle adjustment mechanism according to the first example embodiment as viewed from the front.
Figure 3:
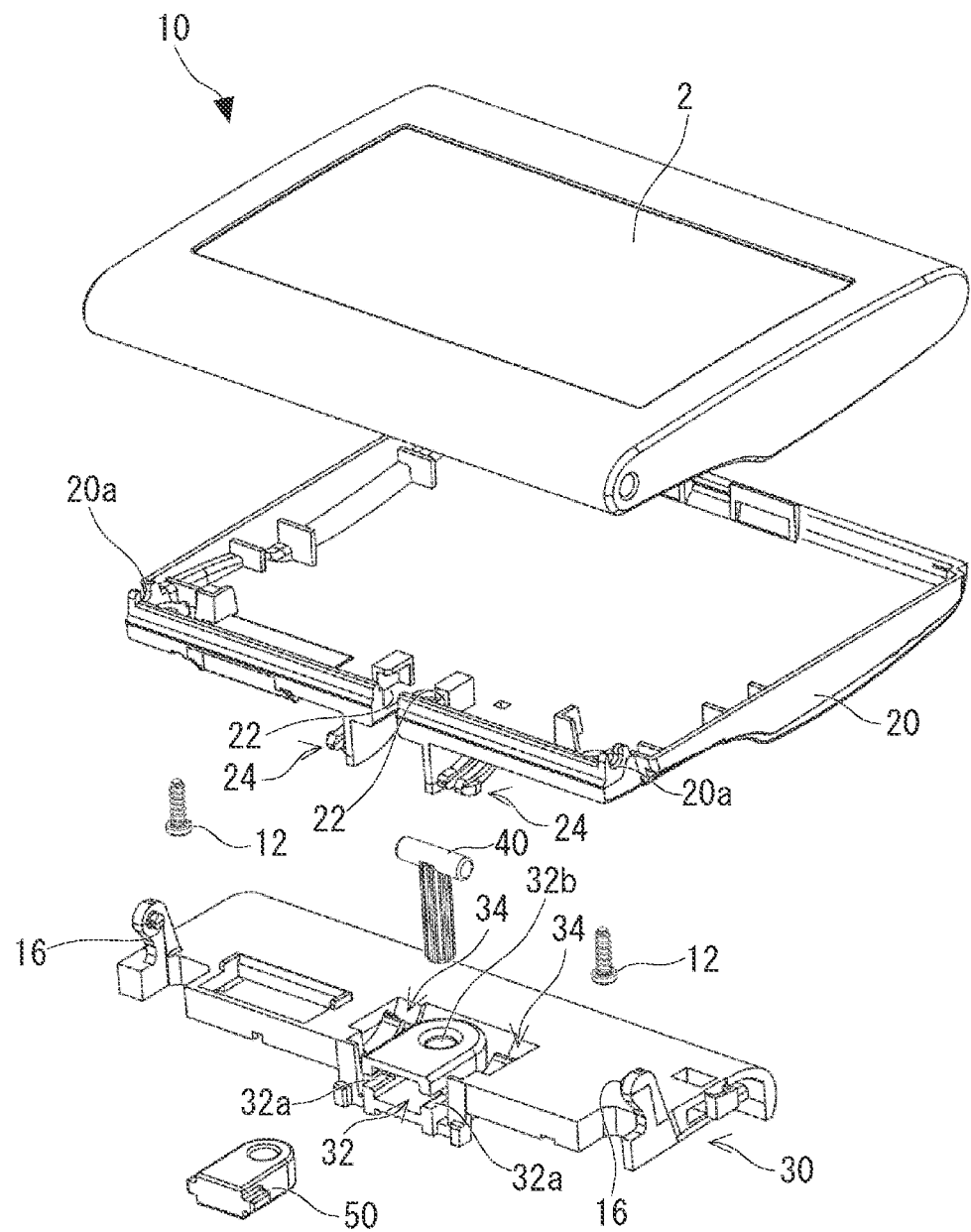
FIG. 3 is an exploded diagram of the angle adjustment mechanism according to the first example embodiment.

FIG. 2 is a perspective diagram of the angle adjustment mechanism 10 according to the first example embodiment as viewed from the front. FIG. 3 is an exploded diagram of the angle adjustment mechanism 10 according to the first example embodiment. As described above, the angle adjustment mechanism 10 can be mounted on the desktop apparatus 1 illustrated in FIG. 1. In other words, the desktop apparatus 1 according to the first example embodiment includes the angle adjustment mechanism 10, the apparatus main body 4, and the display device 2. Although the desktop apparatus 1 illustrated in FIG. 1 is a telephone, the desktop apparatus 1 on which the angle adjustment mechanism 10 according to the first example embodiment is mounted is not limited to a telephone. The desktop apparatus 1 on which the angle adjustment mechanism 10 is mounted may be an optional apparatus having the display device 2.

As illustrated in FIGS. 2 and 3, the angle adjustment mechanism 10 includes a base member 20, a mount member 30, a support member 40, and a suppression member 50. The base member 20 corresponds to the base member 6 illustrated in FIG. 1. The base member 20 can be attached with the display device 2. The display device 2 may be fixed to the base member 20 by screws 12.

The mount member 30 is attached to the apparatus main body 4. In other words, the angle adjustment mechanism 10 is attached to the apparatus main body 4 via the mount member 30. The mount member 30 has a rotation shaft 16 that rotatably connects the base member 20. The rotation shaft 16 is inserted into a bearing hole 20a provided in the base member 20. As a result, as indicated by an arrow A in FIG. 2, the base member 20 to which the display device 2 is attached rotates around the rotation shaft 16. In this manner, the display device 2 and the base member 20 are integrated and can perform the tilt operation with respect to the apparatus main body 4.

The support member 40 supports the base member 20 from below. The support member 40 moves up and down in conjunction with a rotation operation (tilt operation) of the base member 20. Details will be described later. The suppression member 50 is formed of an elastic material such as a silicon rubber, for example. The suppression member 50 is accommodated in an accommodation unit 32 of the mount member 30. The suppression member 50 suppresses the up-and-down movement of the support member 40 by frictional force. Details will be described later. In the present example embodiment, "upward direction" does not strictly mean a directly upward direction. Likewise, "downward direction" does not strictly mean a directly downward direction.

Figure 4:
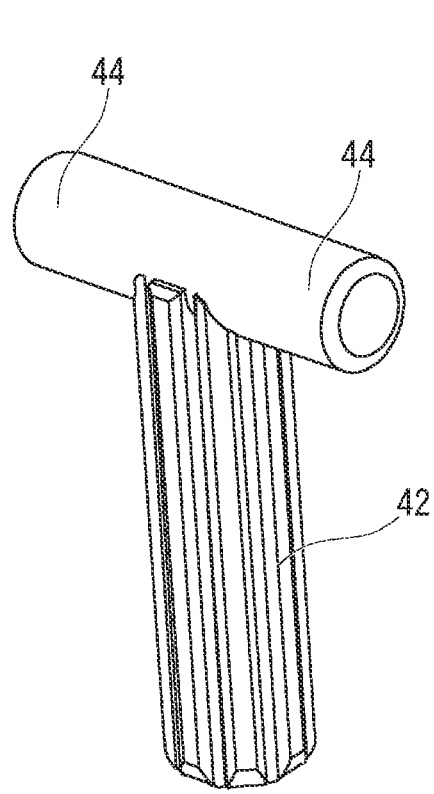
FIG. 4 is a perspective diagram illustrating a support member according to the first example embodiment.
Figure 9:
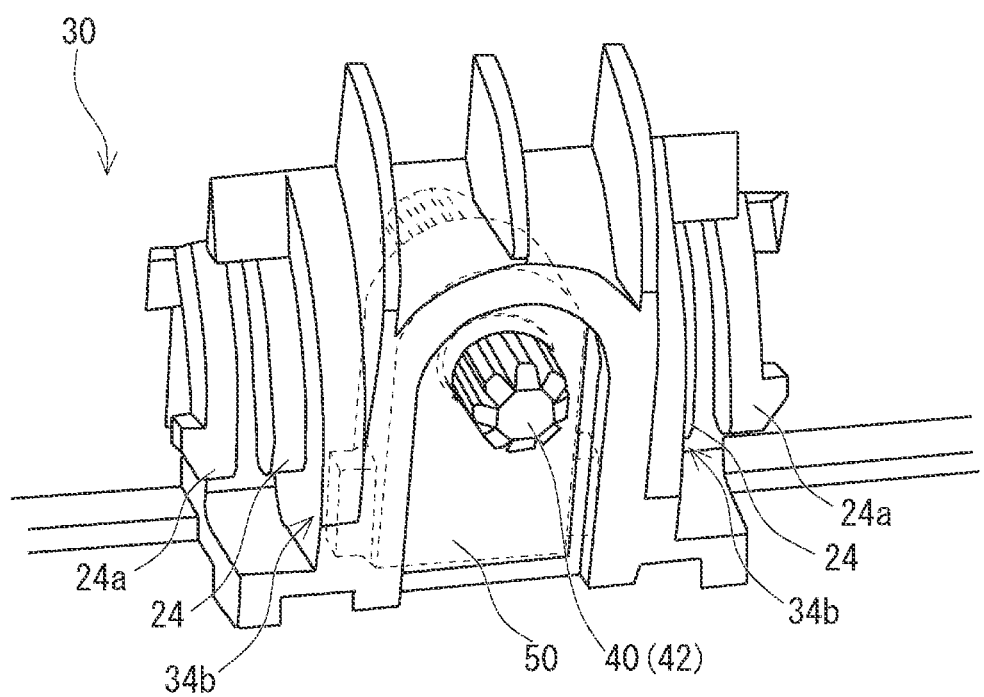
FIG. 9 is a diagram illustrating a state in which the guide rib is inserted into the guide groove.

FIG. 4 is a perspective diagram illustrating the support member 40 according to the first example embodiment. The support member 40 is formed by integrating a sliding rod 42 and two engagement units 44. The support member 40 is formed in a T-shape by these constituent parts. Preferably, the support member 40 is formed of a mold material. For example, the support member 40 is formed of an ABS resin or an acrylic resin. From a macroscopic point of view, it is preferable that grooves be formed at equal intervals in a longitudinal direction around the sliding rod 42. For example, as illustrated in FIG. 9 to be described later, eight grooves are formed at equal intervals around the sliding rod 42. On the other hand, from a microscopic point of view, it is preferable that a surface of the sliding rod 42 be processed smoothly to the extent that it has gloss. Preferably, the engagement unit 44 is formed in a columnar shape.

Figure 5:
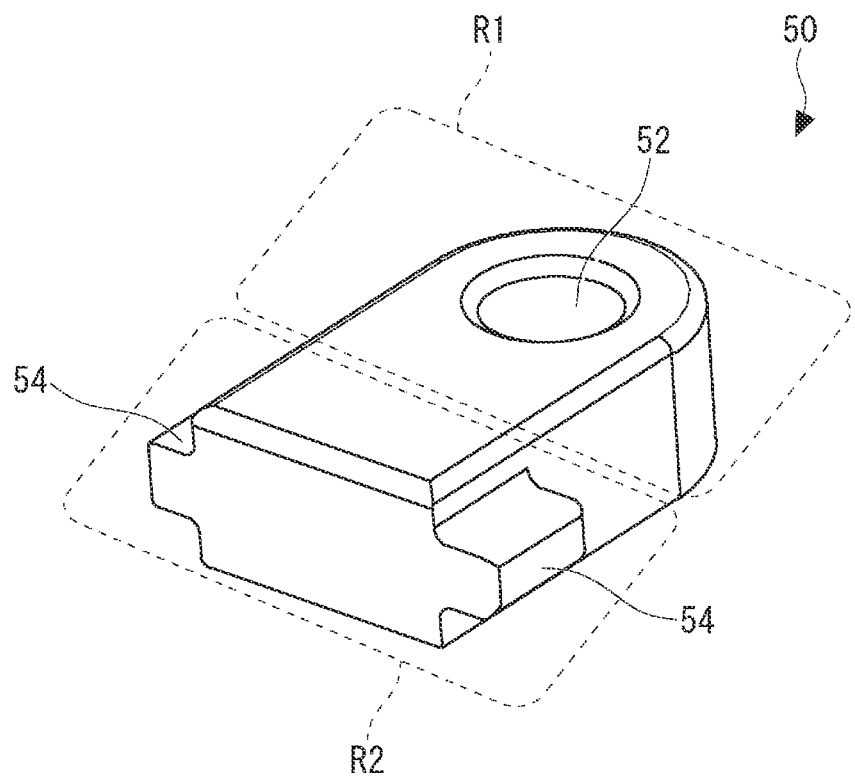
FIG. 5 is a perspective diagram illustrating a suppression member according to the first example embodiment.

FIG. 5 is a perspective diagram illustrating the suppression member 50 according to the first example embodiment. The suppression member 50 is provided with a hole 52 in a region R1. The sliding rod 42, which is a part of the support member 40, is inserted into the hole 52. Herein, an outer diameter of the sliding rod 42 is larger than an inner diameter of the hole 52 in a state in which the sliding rod 42 is not inserted. As described above, since the suppression member 50 is formed of an elastic material, when the sliding rod 42 is inserted into the hole 52, the sliding rod 42 is press-fitted in such a way as to expand the hole 52. As a result, frictional force can be easily generated between the suppression member 50 and the sliding rod 42 (support member 40) in the hole 52.

Figure 10:
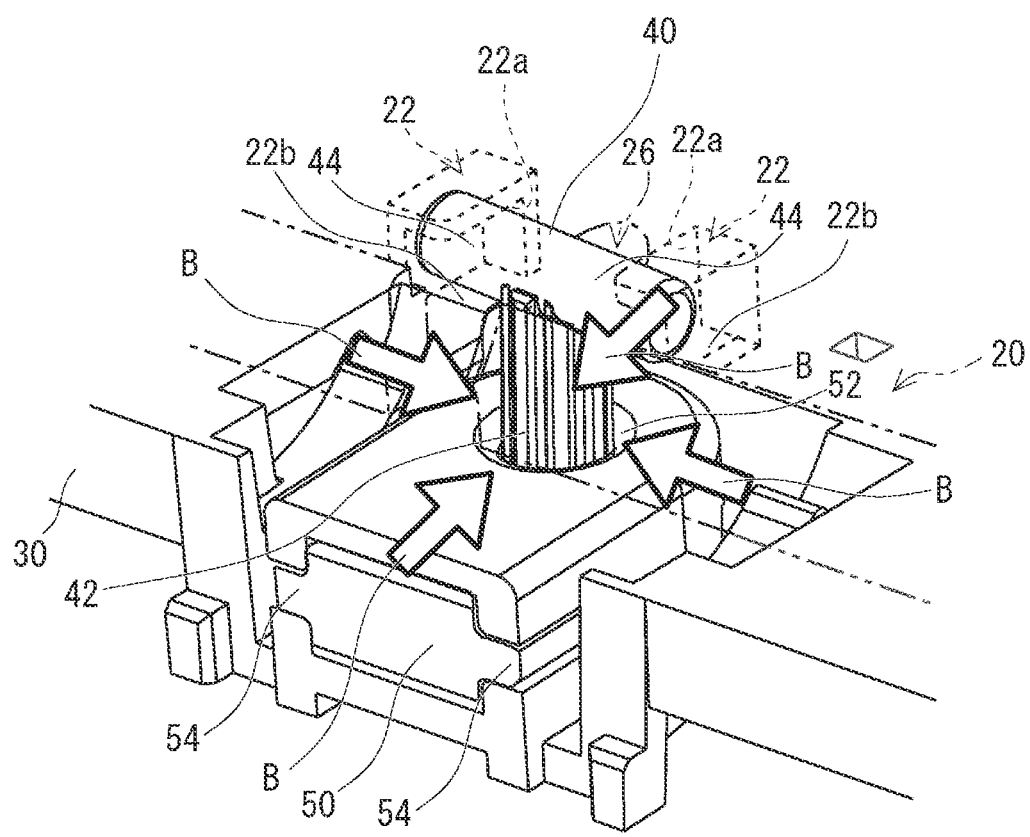
FIG. 10 is a diagram illustrating details of the angle adjustment mechanism according to the first example embodiment.

The suppression member 50 has a protrusion 54 in a region R2 different from the region R1 when viewed from a direction in which the hole 52 is formed. The projection 54 is engaged with a groove 32a of the accommodation unit 32 of the mount member 30, whereby the suppression member 50 is fixed to the mount member 30. Herein, the protrusion 54 does not reach a vicinity of the hole 52, i.e., the region R1. In other words, the protrusion 54 is not formed on the side of the hole 52. As a result, as illustrated in FIG. 10 to be described later, when the suppression member 50 is fixed to the mount member 30, the suppression member 50 is not in contact with the mount member 30 around the hole 52.

A hole 32b is formed in an upper surface of the accommodating unit 32 at a position facing the hole 52 when the suppression member 50 is accommodated. The sliding rod 42 passes through the hole 32b and is inserted into the hole 52 of the suppression member 50. A state in which the support member 40 is attached to the suppression member 50 will be described later by using FIG. 10.

Figure 6:
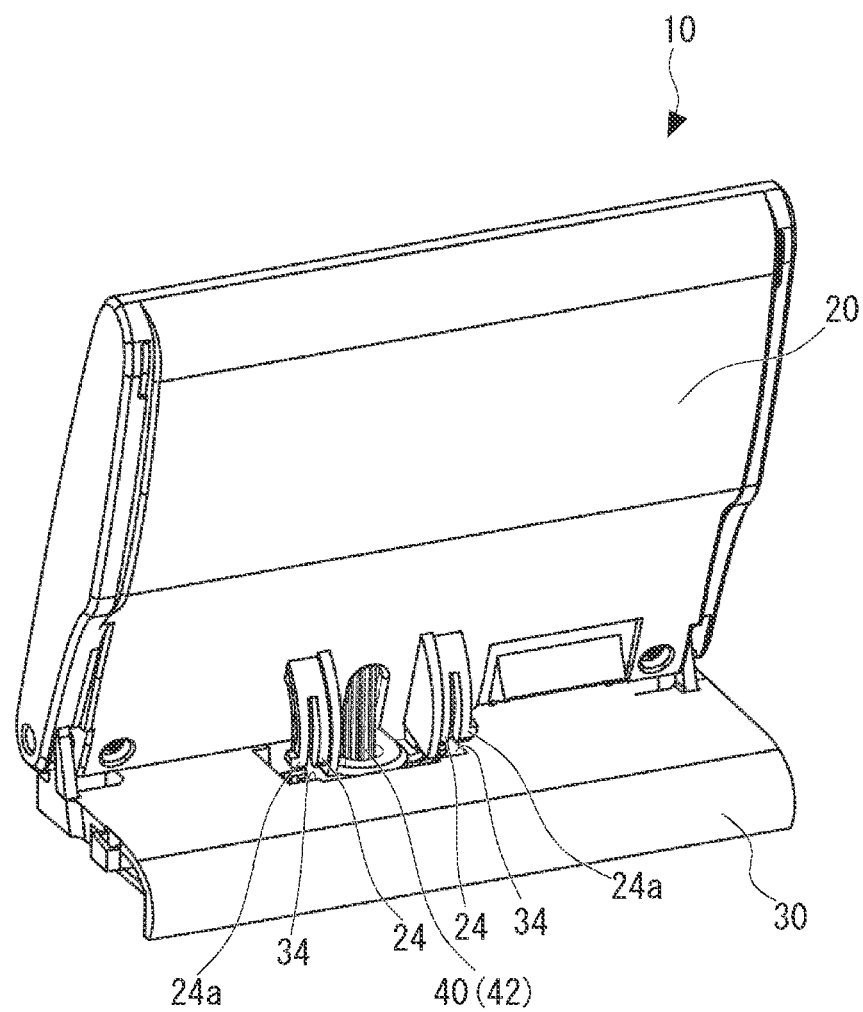
FIG. 6 is a perspective diagram of the angle adjustment mechanism according to the first example embodiment as viewed from the back.

FIG. 6 is a perspective diagram of the angle adjustment mechanism 10 according to the first example embodiment as viewed from the back. As illustrated in FIG. 3, a guide rib 24 is formed on the base member 20. A guide groove 34 is formed in the mount member 30. As illustrated in FIG. 6, the guide rib 24 is inserted into the guide groove 34. The guide rib 24 slides in the guide groove 34, whereby the tilt operation of the display device 2 (base member 20) about the rotation shaft 16 can be stably performed.

Figure 7:
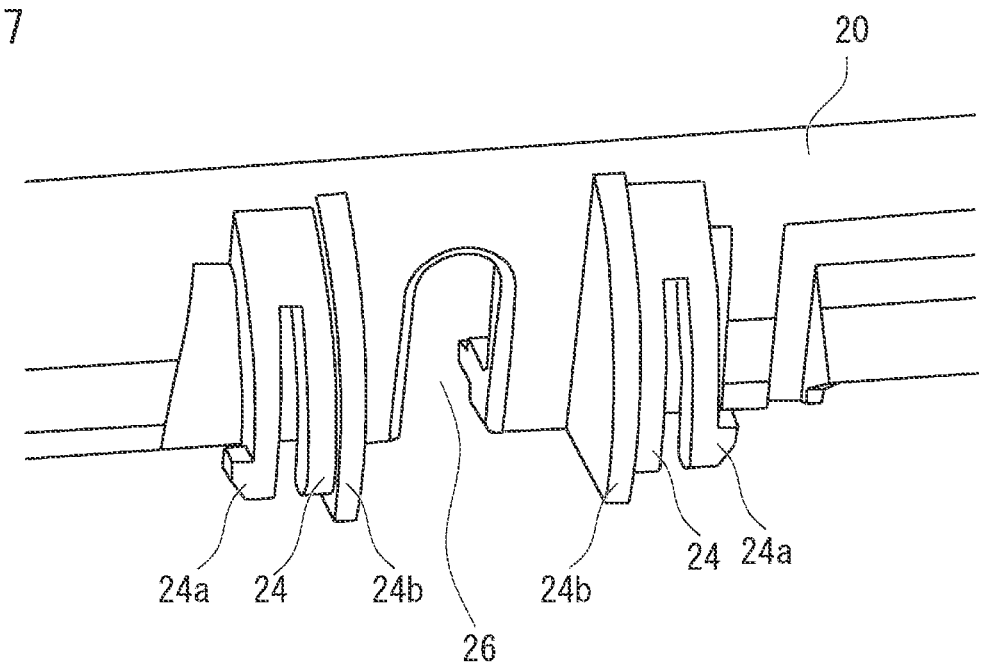
FIG. 7 is a diagram illustrating details of a guide rib provided on a base member according to the first example embodiment.
Figure 8:
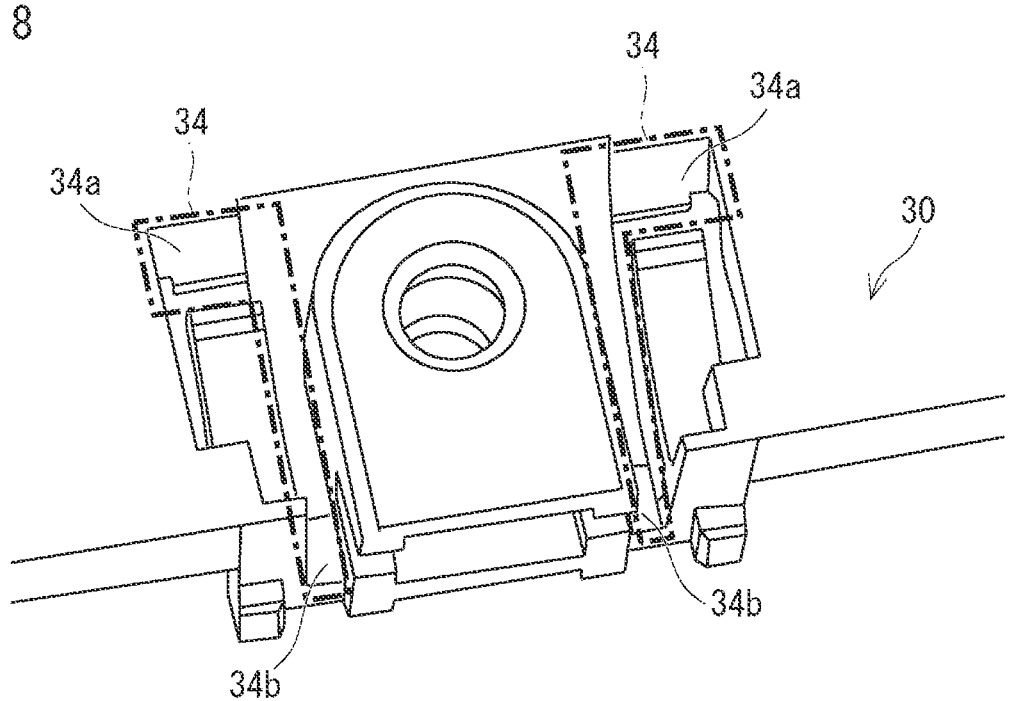
FIG. 8 is a diagram illustrating details of a guide groove provided in a mount member according to the first example embodiment.

FIG. 7 is a diagram illustrating details of the guide rib 24 provided on the base member 20 according to the first example embodiment. FIG. 8 is a diagram illustrating details of the guide groove 34 provided in the mount member 30 according to the first example embodiment. FIG. 9 is a diagram illustrating a state in which the guide rib 24 is inserted into the guide groove 34. FIG. 9 is a view from a bottom surface side of the mount member 30. As illustrated in FIG. 7, an elongated hole 26 is formed between the two guide ribs 24. As illustrated in FIG. 9, the suppression member 50 and the support member 40 are positioned between the two sets of the guide ribs 24 and the guide grooves 34.

When the guide rib 24 is inserted into a hole 34a of the guide groove 34, a claw 24a of the guide rib 24 is pressed toward a wall unit 24b by a wall surface of the hole 34a. When the guide rib 24 is further inserted into the hole 34a of the guide groove 34, the claw 24a returns to its original position. As a result, the claw 24a is caught by the wall surface of the hole 34a, and the guide rib 24 is prevented from coming out of the hole 34a. In this state, the wall unit 24b formed in a sector shape slides on a guide unit 34b.

Herein, the guide groove 34 has a shape curved in an arc shape. Specifically, the guide groove 34 is formed in a smooth curved surface having a distance to an imaginary line connecting the two rotation shafts 16 as a radius of curvature. As illustrated in FIG. 7, the guide rib 24 is similarly formed in a smooth curved surface curved in an arc shape in such a way as to be able to smoothly slide on the guide groove 34. As a result, when the display device 2 (base member 20) is manually moved, the tilt operation about the rotation shaft 16 can be smoothly performed.

FIG. 10 is a diagram illustrating details of the angle adjustment mechanism 10 according to the first example embodiment. FIG. 10 is a diagram illustrating a state in which the support member 40 is press-fitted into the hole 52 of the suppression member 50. As illustrated in FIGS. 3 and 10, two engagement grooves 22 are formed in the base member 20. The engagement groove 22 is formed by an upper surface 22a and a lower surface 22b.

The elongated hole 26 is formed between the two engagement grooves 22 of the base member 20. The sliding rod 42 is inserted into the elongated hole 26. As a result, even when the support member 40 moves up and down, the sliding rod 42 does not contact the base member 20. Therefore, the base member 20 does not hinder the movement of the sliding rod 42.

In a state that the sliding rod 42 of the support member 40 is inserted into the elongated hole 26, the engagement units 44 of the support member 40 are each engaged with the engagement grooves 22. As described above, the engagement unit 44 is caught in the engagement groove 22, whereby the support member 40 operates in conjunction with the rotation (tilt operation) of the display device 2 (base member 20). Specifically, when the user moves the display device 2 as to be raised in such a way that an angle of the base member 20 with respect to the mount member 30 becomes larger from a state in which the angle is small, the engagement unit 44 is pressed upward by the lower surface 22b of the engagement groove 22. As a result, the support member 40 moves in the upward direction along the hole 52 against frictional force between the support member 40 and the suppression member 50. On the other hand, when the user moves the display device 2 as to be laid down in such a way that the angle of the base member 20 with respect to the mount member 30 becomes smaller from a state in which the angle is large, the engagement unit 44 is pressed downward by the upper surface 22a of the engagement groove 22. As a result, the support member 40 moves downward along the hole 52 against the frictional force between the support member 40 and the suppression member 50.

As described above, since the sliding rod 42 is inserted (press-fitted) into the hole 52 of the suppression member 50, when the display device 2 (base member 20) rotates (tilts), the support member 40 moves up and down along the hole 52. Further, when the rotation (tilt operation) of the display device 2 (base member 20) stops, the operation of the support member 40 is suppressed by the frictional force caused by compressive force of the suppression member 50 that tends to contract the hole 52. Accordingly, the support member 40 supports the base member 20 in such a way that the display device 2 rests at a stopped angle. In this manner, the angle adjustment mechanism 10 according to the first example embodiment achieves a free stop function in which the angle (inclination) of the display device 2 can be manually changed.

Further, as described above, since the surface of the sliding rod 42 is smoothly processed, when the user manually rotates (tilts) the display device 2 (base member 20), the support member 40 can easily move up and down. In other words, when the user rotates (tilts) the display device 2 (base member 20), the display device 2 can be easily moved against the frictional force. On the other hand, when the user stops the rotation of the display device 2 (base member 20), the movement of the support member 40 is suppressed by the frictional force, and therefore, the display device 2 (base member 20) can rest at the tilt angle when the display device 2 (base member 20) stops. In other words, the frictional force is larger than self-weight of the display device 2 and the base member 20.

Further, as indicated by an arrow B in FIG. 10, the sliding rod 42 receives compressive force in a direction in which the sliding rod 42 is crushed in the entire circumference thereof by the suppression member 50. In other words, the sliding rod 42 receives compressive force in its entire circumference by the suppression member 50 in a direction in which the hole 52 expanded by the sliding rod 42 is to be contracted, i.e., in a direction in which the sliding rod 42 inserted into the hole 52 is tightened. As described above, the compressive force (repulsive force) by the suppression member 50, which is an elastic material, is applied only to the sliding rod 42 of the support member 40. Therefore, it is possible to suppress the application of a load to the surrounding components by the repulsive force of the suppression member 50. Therefore, the angle adjustment mechanism 10 according to the first example embodiment can suppress the influence on the surrounding components due to the frictional force for maintaining the angle of the display device 2.

The support member 40 (sliding rod 42) is formed of a mold component having relatively high rigidity. Therefore, a possibility that the support member 40 is deformed by the compressive force of the suppression member 50 is extremely low. In addition, since the support member 40 is formed of a mold component having high rigidity rather than an elastic material, repulsive force against the base member 20 by the support member 40 is hardly generated. All the self-weight of the display device 2 and the base member 20 is applied to the support member 40. As described above, since the repulsion force of the suppression member 50 is applied only to the support member 40 and is not transmitted to other members, and the support member 40 hardly generates the repulsion force, a load is hardly applied to the base member 20. Therefore, it is possible to suppress the application of a load to surrounding components such as the rotation shaft 16.

Further, as illustrated in FIG. 5, the protrusion 54 of the suppression member 50 is not formed around the hole 52. In other words, when viewed from a direction in which the hole 52 is formed, a region in which the hole 52 is formed in the suppression member 50 and a region in which the protrusion 54 is formed are different from each other. In further other words, the suppression member 50 is in contact with the mount member 30 in a region different from the region in which the hole 52 is formed when viewed from the direction in which the hole 52 is formed.

Thus, as described above, the suppression member 50 can be fixed to the mount member 30 while preventing the suppression member 50 from contacting the mount member 30 around the hole 52. Accordingly, when the support member 40 is press-fitted into the hole 52 of the suppression member 50, not only an inner side but also an outer side of the hole 52 can be deformed. Therefore, repulsive force may also be generated around the suppression member 50. On the other hand, in the first example embodiment, since the suppression member 50 does not contact the mount member 30 around the hole 52, it is possible to suppress the repulsive force that may be generated outside the suppression member 50 from being transmitted to the mount member 30. Therefore, it is possible to suppress the influence of the repulsive force that may be generated around the suppression member 50 on the surrounding components.

Further, as described above, grooves are formed in a longitudinal direction at equal intervals around the sliding rod 42. In other words, in a portion of the support member 40 that slides through the hole 52, grooves are formed at equal intervals along the sliding direction of the support member 40 at positions symmetrical to each other when viewed from an axial direction of the sliding portion. Since the sliding rod 42 is formed in this manner, a portion where the sliding rod 42 contacts an inner wall of the hole 52 of the suppression member 50 is narrowed to a symmetrical position, whereby a bias of the force (repulsion force) applied to the sliding rod 42 can be suppressed. In other words, as for the sliding rod 42, the repulsive force is applied to the portion in contact with the inner wall of the hole 52 and therefore, the portion in which the repulsive force is applied is limited to the symmetrical position in the entire circumference, whereby it is possible to suppress the bias of the repulsive force applied to the sliding rod 42. As a result, when the user rotates the display device 2, up-and-down movement of the sliding rod 42 becomes smooth. Therefore, the user can smoothly rotate the display device 2.

Next, a procedure of assembling the angle adjustment mechanism 10 will be described.

Figure 11:
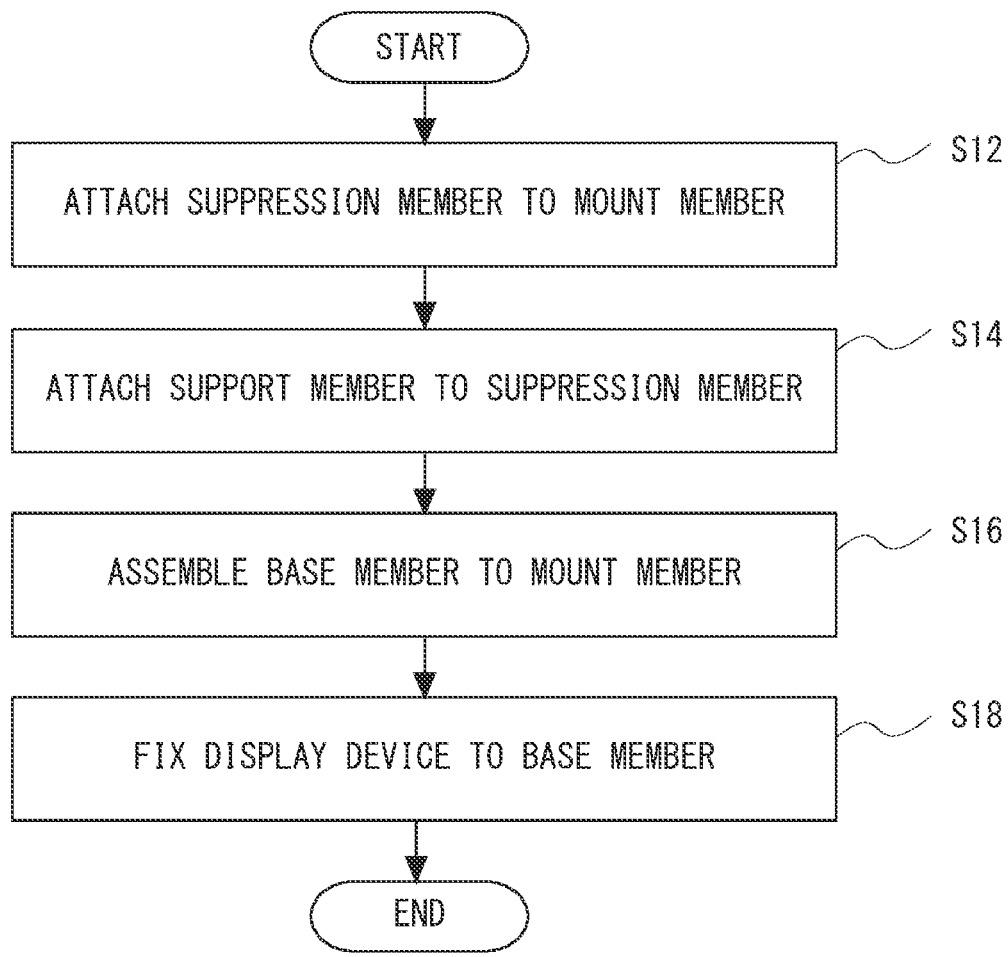
FIG. 11 is a flowchart illustrating a method for assembling the angle adjustment mechanism according to the first example embodiment.

FIG. 11 is a flowchart illustrating a method for assembling the angle adjustment mechanism 10 according to the first example embodiment. First, the suppression member 50 is attached to the mount member 30 (Step S12). Specifically, the suppression member 50 is inserted into the accommodation unit 32 of the mount member 30. Next, the support member 40 is attached to the suppression member 50 (Step S14). Specifically, the sliding rod 42, which is a part of the support member 40, is inserted (press-fitted) into the hole 52 of the suppression member 50.

Next, the base member 20 is assembled to the mount member 30 (Step S16). More specifically, the engagement unit 44 of the support member 40 is caught in the engagement groove 22 of the base member 20 while the sliding rod 42 of the support member 40 passes through the elongated hole 26. Further, the rotation shaft 16 provided in the mount member 30 is inserted into the bearing hole 20a provided in the base member 20. Further, the guide rib 24 provided on the base member 20 is inserted into the guide groove 34 provided on the mount member 30. Finally, the display device 2 is fixed to the base member 20 (Step S18). Specifically, the display device 2 is fitted to the base member 20, and the screw 12 is fastened from a back surface of the base member 20.

Next, an operation of the angle adjustment mechanism 10 will be described.

Figure 12:
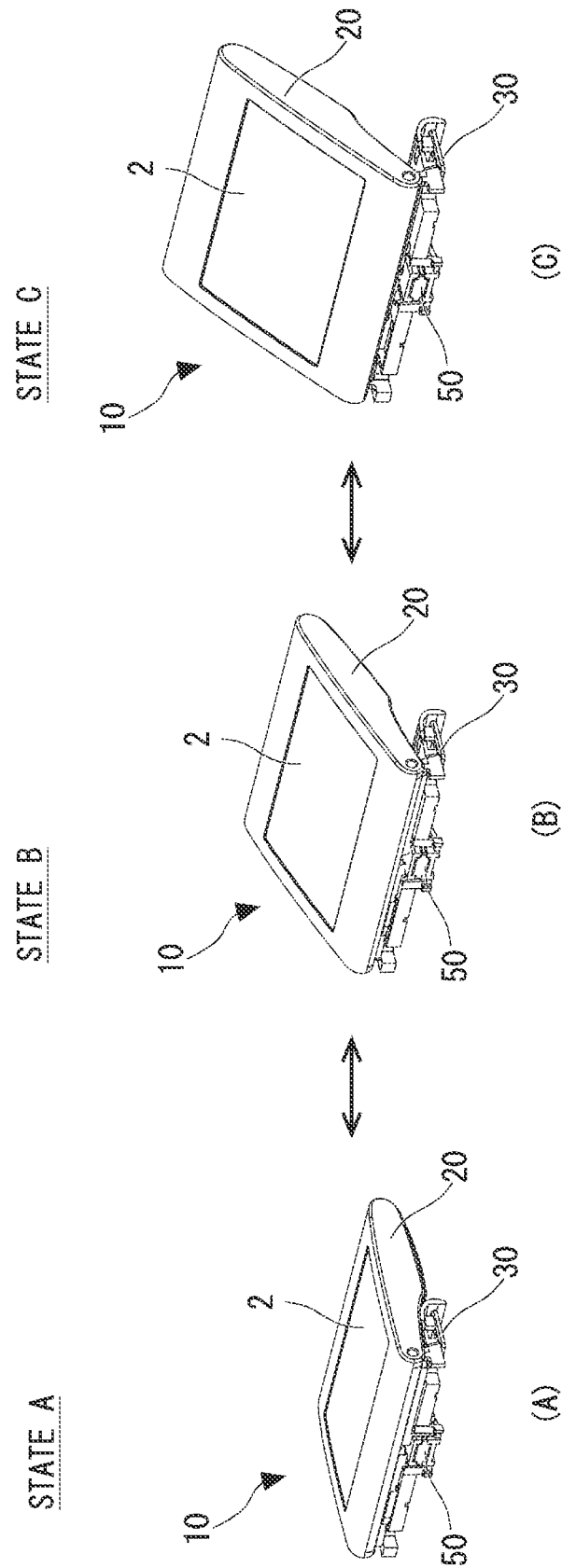
FIG. 12 is a diagram illustrating a state in which a display device is rotated by the angle adjustment mechanism according to the first example embodiment.
Figure 13:
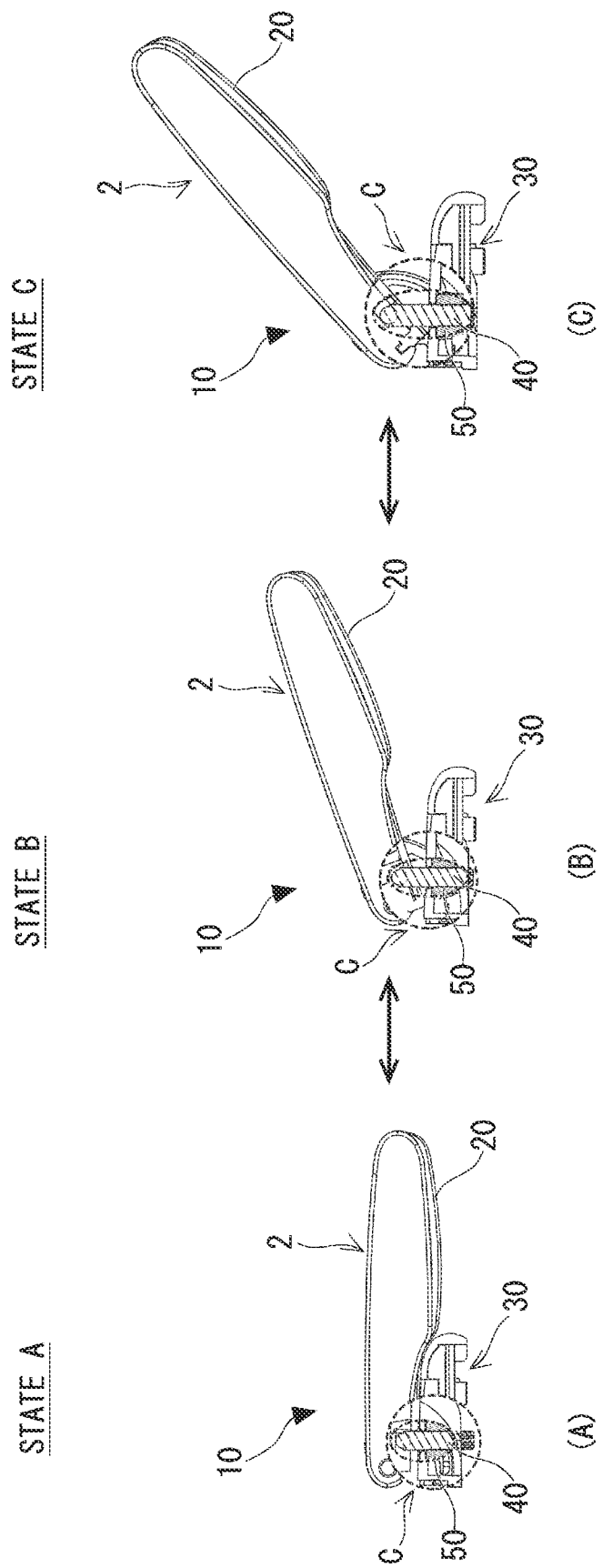
FIG. 13 is a diagram illustrating a state in which the display device is rotated by the angle adjustment mechanism according to the first example embodiment.
Figure 14:
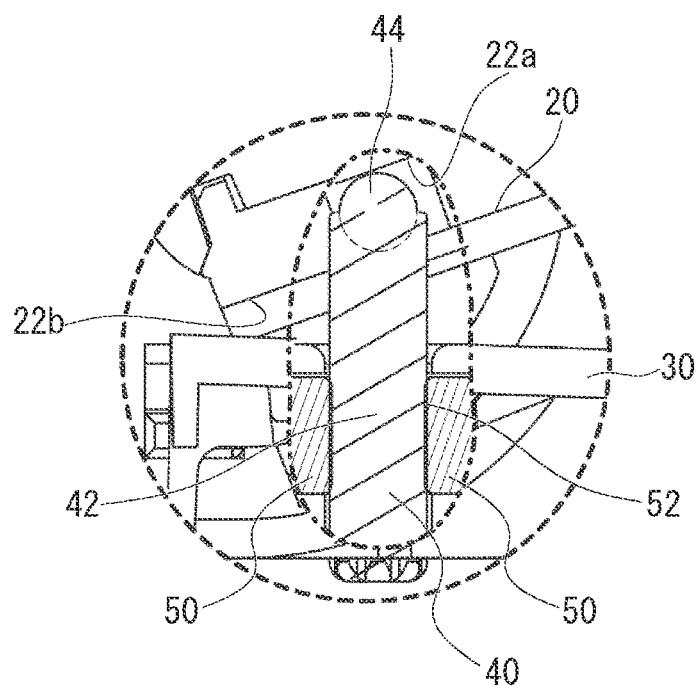
FIG. 14 is an enlarged diagram of a cross section of the support member and the suppression member in FIG. 13.

FIGS. 12 and 13 are diagrams each illustrating a state in which the display device 2 is rotated by the angle adjustment mechanism 10 according to the first example embodiment. FIG. 12 illustrates a perspective diagram of the angle adjustment mechanism 10. FIG. 13 illustrates a side diagram of the angle adjustment mechanism 10, and a portion surrounded by a two-dot chain line indicated by an arrow C illustrates a cross section of the support member 40 and the suppression member 50. FIG. 14 is an enlarged diagram of the cross section of the support member 40 and the suppression member 50 in FIG. 13.

FIGS. 12(A) and 13(A) are diagrams each illustrating a state (state A) in which the angle of the base member 20 (display device 2) with respect to the mount member 30 (apparatus main body 4) is the smallest. In other words, FIGS. 12(A) and 13(A) are diagrams each illustrating a state in which the display device 2 is most laid down with respect to the apparatus main body 4. FIGS. 12(C) and 13(C) are diagrams each illustrating a state (state C) in which the angle of the base member 20 (display device 2) with respect to the mount member 30 (apparatus main body 4) is the largest. In other words, FIGS. 12(C) and 13(C) are diagrams each illustrating a state in which the display device 2 is most raised with respect to the apparatus main body 4. FIGS. 12(B) and 13(B) are diagrams each illustrating a state (state B) between the state A and the state C.

In the state A, the user manually rotates the display device 2 (base member 20) in the upward direction, thereby entering the state B. Herein, as described above, since the engagement unit 44 of the support member 40 is caught in the engagement groove 22 and the lower surface 22b of the engagement groove 22 presses the engagement unit 44 upward, when the state shifts from the state A to the state B, the support member 40 moves in the upward direction. At this time, even when the support member 40 receives the self-weight of the display device 2 and the base member 20, the support member 40 is suppressed from falling in the downward direction by the repulsive force of the suppression member 50 (the frictional force between the support member 40 and the suppression member 50). Therefore, the inclination of the display device 2 is held at an angle as illustrated in the state B.

In the state B, the user manually rotates the display device 2 (base member 20) further in the upward direction, thereby entering the state C. In this case as well, the support member 40 is moved in the upward direction. The support member 40 is suppressed from falling in the downward direction by the repulsive force of the suppression member 50 (the frictional force between the support member 40 and the suppression member 50), even when the support member 40 receives the self-weight of the display device 2 and the base member 20. Therefore, the inclination of the display device 2 is held at an angle as illustrated in the state C. In this manner, when the user manually rotates the display device 2 (base member 20) in the upward direction, the inclination of the display device 2 can be adjusted to an optional angle.

On the other hand, in the state C, the user manually rotates the display device 2 (base member 20) in the downward direction, thereby entering the state B. Herein, as described above, since the engagement unit 44 of the support member 40 is caught in the engagement groove 22 and the upper surface 22a of the engagement groove 22 presses the engagement unit 44 downward, when the state shifts from the state C to the state B, the support member 40 moves in the downward direction. At this time, even when the support member 40 receives the self-weight of the display device 2 and the base member 20, the support member 40 is suppressed from falling in the downward direction by the repulsive force of the suppression member 50 (the frictional force between the support member 40 and the suppression member 50). Therefore, the inclination of the display device 2 is held at an angle as illustrated in the state B.

In the state B, the user manually rotates the display device 2 (base member 20) further in the downward direction, thereby entering the state A. In this case as well, the support member 40 moves in the downward direction. The support member 40 is suppressed from falling in the downward direction by the repulsive force of the suppression member 50 (the frictional force between the support member 40 and the suppression member 50) even when the support member 40 receives the self-weight of the display device 2 and the base member 20. Therefore, the inclination of the display device 2 is held at an angle as illustrated in the state A. In this manner, when the user manually rotates the display device 2 (base member 20) in the downward direction, the inclination of the display device 2 can be adjusted to an optional angle.

The support member 40 according to the first example embodiment is formed in a T-shape. A vertical bar of the T-shape corresponds to the sliding rod 42, and a horizontal bar of the T-shape corresponds to the engagement unit 44. In this manner, by forming the support member 40 in a T-shape, it is possible to prevent the operation of the display device 2 from being hindered. Specifically, when the support member 40 moves up and down in conjunction with the operation of the display device 2 (base member 20) as illustrated in FIG. 13, when a contact point between the support member 40 and the base member 20 changes greatly, there is a risk that the load required to rotate the display device 2 may change greatly. Therefore, the operability may be deteriorated.

On the other hand, by forming the support member 40 in a T-shape, a range of a portion where the support member 40 and the base member 20 come into contact with each other can be made constant when the support member 40 moves up and down. Therefore, it is possible to suppress a large change in the load required to rotate the display device 2. Therefore, good operability can be achieved by a simple structure of the T-shape. Further, by making the shape of the engagement unit 44 cylindrical, it is possible to suppress discontinuous change in the contact point between the support member 40 and the base member 20 when the support member 40 moves up and down. Therefore, it is possible to suppress discontinuous change in the load required to rotate the display device 2. Therefore, better operability can be achieved.

Comparative Example

Next, a comparative example will be described. An angle adjustment mechanism according to the comparative example is different from the angle adjustment mechanism 10 according to the first example embodiment in that a silicon rubber member is put in on a sliding surface between a base member and a mount member.

Figure 15:
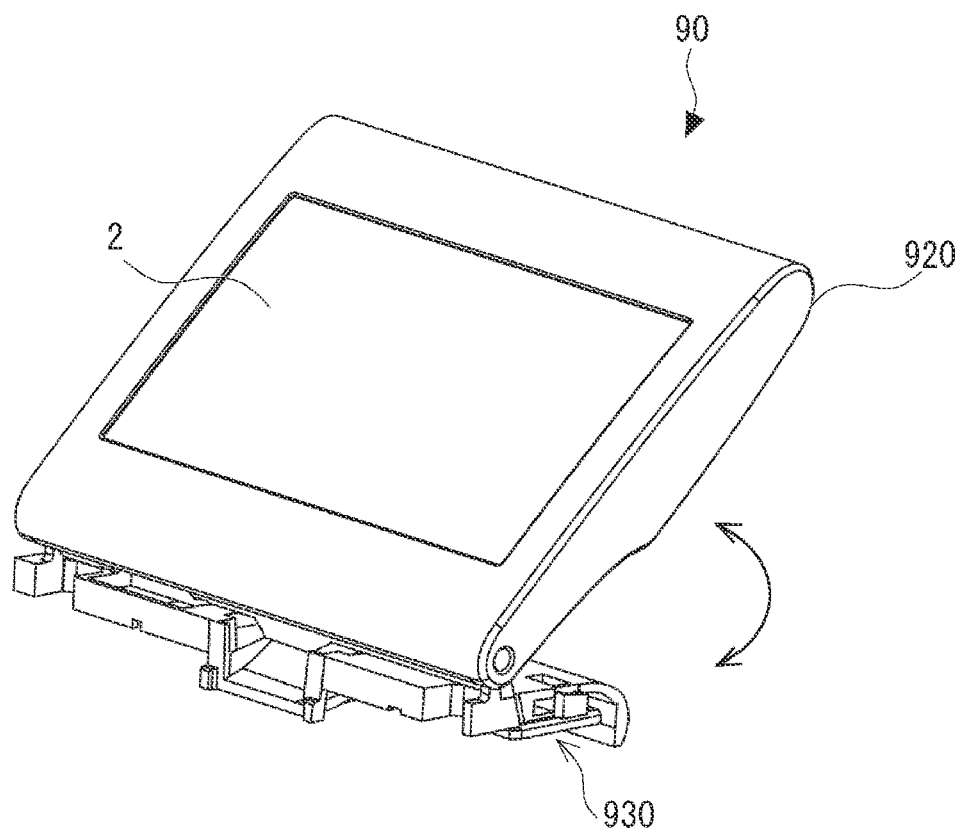
FIG. 15 is a perspective diagram illustrating an angle adjustment mechanism according to a comparative example.
Figure 16:
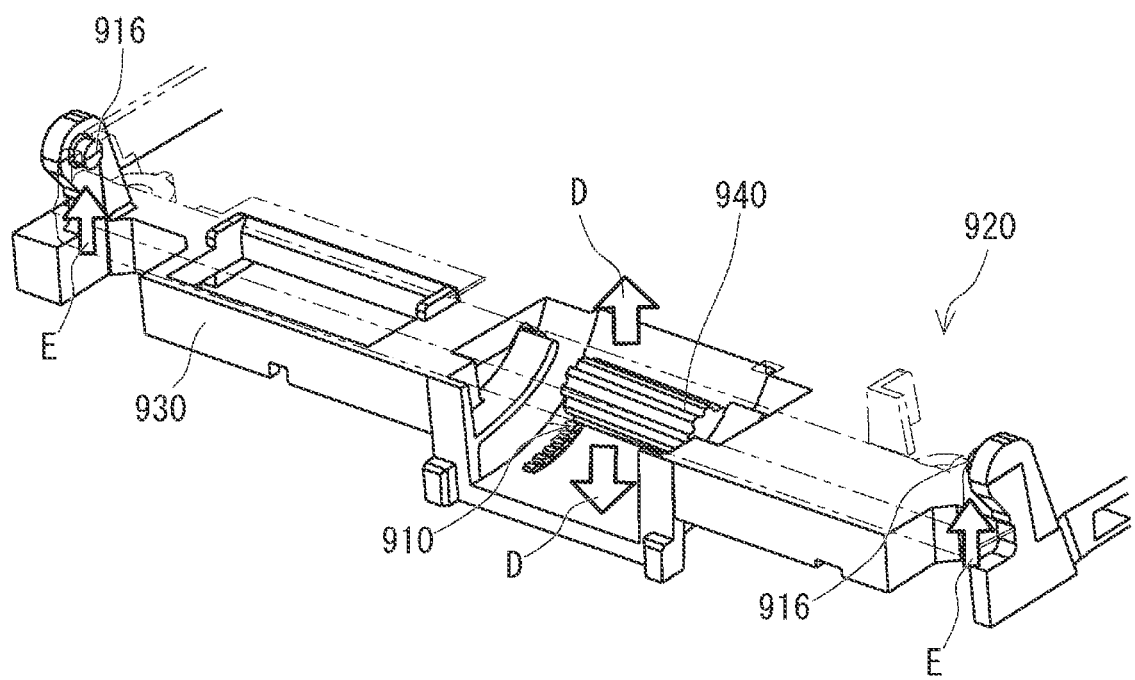
FIG. 16 is a diagram illustrating details of the angle adjustment mechanism according to the comparative example.

FIG. 15 is a perspective diagram illustrating an angle adjustment mechanism 90 according to the comparative example. FIG. 16 is a diagram illustrating details of the angle adjustment mechanism 90 according to the comparative example (a portion surrounded by an ellipse in FIG. 15). The angle adjustment mechanism 90 according to the comparative example includes a base member 920 to which the display device 2 is attached, a mount member 930, and an elastic member 940. The base member 920 is rotatably connected to a rotation shaft 916 provided on the mount member 930. The base member 920 has substantially the same structure as the guide rib 24 according to the first example embodiment. The mount member 930 has substantially the same structure as the guide groove 34 according to the first example embodiment.

Figure 17:
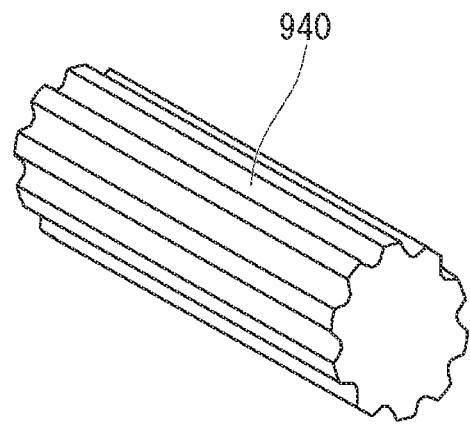
FIG. 17 is a perspective diagram illustrating an elastic member according to the comparative example.
Figure 18:
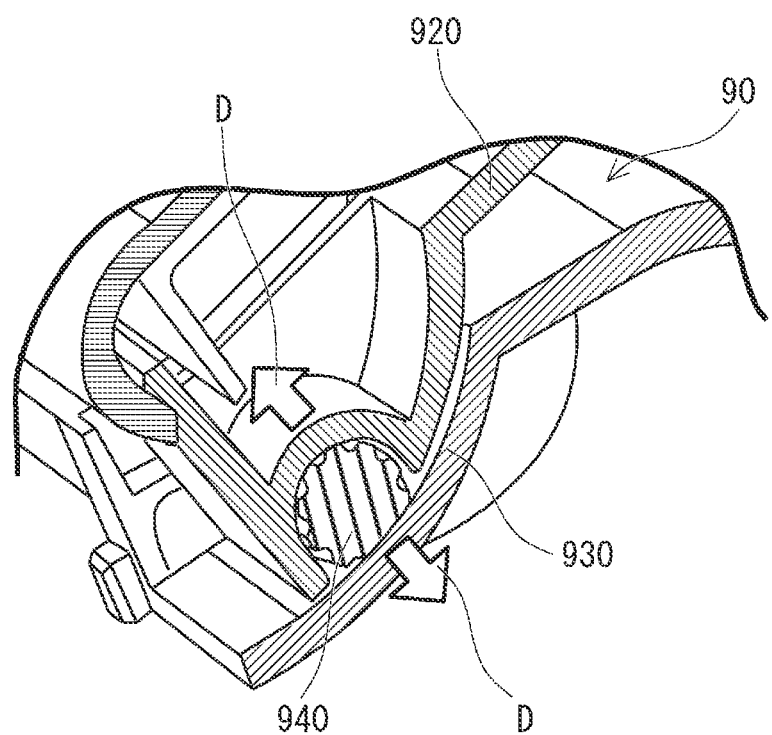
FIG. 18 is a cross-sectional diagram illustrating a vicinity of an elastic member of the angle adjustment mechanism according to the comparative example.

FIG. 17 is a perspective diagram illustrating the elastic member 940 according to the comparative example. FIG. 18 is a cross-sectional diagram illustrating a vicinity of the elastic member 940 of the angle adjustment mechanism 90 according to the comparative example. The elastic member 940 is formed in a cylindrical shape. The elastic member 940 is formed of, for example, a silicon rubber. The elastic member 940 is put in on a sliding surface 910 between the base member 920 and the mount member 930. When the elastic member 940 is compressed by the base member 920 and the mount member 930, frictional force is generated between the elastic member 940 and the base member 920 and between the elastic member 940 and the mount member 930. This frictional force allows the user to adjust an inclination of the display device 2 (base member 920) to an optional angle. In other words, when the user manually rotates the display device 2 (base member 920), the base member 920 operates against the frictional force due to the elastic member 940. When the rotation of the display device 2 (base member 920) is stopped, the inclination of the base member 920 is held at an inclination when the inclination is stopped, by the frictional force due to the elastic member 940.

Herein, since the elastic member 940 is compressed, repulsive force is generated by the elastic member 940 in a direction separating the base member 920 and the mount member 930, as indicated by an arrow D in FIGS. 16 and 18. As a result, a load is applied to the rotation shaft 916 connecting the base member 920 and the mount member 930 as indicated by an arrow E in FIG. 16. Herein, since the rotation shaft 916 is generally thin, the rigidity is weak. When a load is applied to such a component having low rigidity, the component may be deformed. Therefore, in the angle adjustment mechanism 90 according to the comparative example, there is a risk that the surrounding components are affected by the frictional force for maintaining the angle of the display device. Further, there is a risk that the user may not be able to perform the angle adjustment successfully due to variations in force that causes the display device 2 to rotate (rotation force). Therefore, in the angle adjustment mechanism 90 according to the comparative example, the quality may not be stable.

On the other hand, the angle adjustment mechanism 10 according to the first example embodiment described above is configured such that the repulsion force by the suppression member 50, which is an elastic member, is applied only to the sliding rod 42 of the support member 40. As a result, the repulsion force by the suppression member 50 is not transmitted to the surrounding components. In other words, the influence of the frictional force by the suppression member 50 is exerted only on the support member 40, and the influence on the surrounding components is suppressed. Therefore, the angle adjustment mechanism 10 according to the first example embodiment can suppress the influence of the frictional force for maintaining the angle of the display device on the surrounding components. In addition, it is possible to suppress the variation of the force that causes the display device 2 to rotate (rotation force). Therefore, the angle adjustment mechanism 10 according to the first example embodiment can achieve stable quality as compared with the angle adjustment mechanism 90 according to the comparative example.

Modifications

It is noted that the present invention is not limited to the above-mentioned example embodiment, and can be appropriately modified within a range not deviating from the gist. For example, the support member 40 may not be T-shaped.

Any shape may be used as long as it is possible to move up and down in conjunction with the rotation of the display device 2. For example, the support member may have an umbrella shape (a shape such as a nail or bolt) in which an upper portion of the rod extends. However, by forming the support member 40 in a T-shape, as described above, it is possible to achieve good operability with a simple structure.

Some or all of the above example embodiment may also be described as the following Supplementary notes, but are not limited to the following.

Supplementary Note 1

An angle adjustment mechanism comprising:
a base member to which a display device is attached;
a support member configured to support the base member from below and move up and down in conjunction with a rotation operation of the base member;
a mount member having a rotation shaft rotatably connecting the base member; and
a suppression member configured to suppress up-and-down movement of the support member by frictional force, the suppression member being formed of an elastic material and attached to the mount member, wherein
the suppression member is provided with a hole into which a part of the support member is inserted, and the frictional force is generated between the suppression member and the support member in the hole, and
the support member is configured to move up and down by sliding through a hole provided in the suppression member in association with a rotation operation of the base member, and to stop movement by the frictional force when the rotation operation of the base member stops.

Supplementary Note 2

The angle adjustment mechanism according to Supplementary note 1, wherein
the support member has a sliding rod that is inserted into a hole provided in the suppression member and that slides through the hole,
an outer diameter of the sliding rod is larger than an inner diameter of the hole in a state in which the sliding rod is not inserted, and
the support member moves up and down by sliding the sliding rod through the hole as the base member rotates around the rotation shaft.

Supplementary Note 3

The angle adjustment mechanism according to Supplementary note 2, wherein
the support member further includes an engagement unit configured to engage with an engagement groove provided in the base member, and
the engagement unit is pressed upward by a lower surface of the engagement groove, whereby the support member moves in an upward direction, and the engagement unit is pressed downward by an upper surface of the engagement groove, whereby the support member moves in a downward direction.

Supplementary Note 4

The angle adjustment mechanism according to Supplementary note 3, wherein the support member is formed in a T-shape, the sliding rod corresponds to a vertical bar of the T-shape, and the engagement unit corresponds to a horizontal bar of the T-shape.

Supplementary Note 5

The angle adjustment mechanism according to Supplementary note 3 or 4, wherein the engagement unit is formed in a cylindrical shape.

Supplementary Note 6

The angle adjustment mechanism according to any one of Supplementary notes 1 to 5, wherein the suppression member is in contact with the mount member in a region different from a region in which the hole is formed when being viewed from a direction in which the hole is formed.

Supplementary Note 7

The angle adjustment mechanism according to any one of Supplementary notes 1 to 6, wherein, in a portion of the support member that slides through the hole, grooves are formed at equal intervals along a sliding direction of the support member, at positions symmetrical to one another when being viewed from an axial direction of the sliding portion.

Supplementary Note 8

A desktop apparatus including:
an apparatus main body;
a display device; and
an angle adjustment mechanism of adjusting an angle of the display device, wherein
the angle adjustment mechanism includes:
a base member to which the display device is attached;
a support member that supports the base member from below and moves up and down in conjunction with a rotation operation of the base member;
a mount member that is attached to the apparatus main body and has a rotation shaft that rotatably connects the base member; and
a suppression member that is formed of an elastic material and attached to the mount member and that suppresses up-and-down movement of the support member by frictional force,
the suppression member is provided with a hole into which a part of the support member is inserted, and the frictional force is generated between the suppression member and the support member in the hole, and
the support member is configured to move up and down by sliding through a hole provided in the suppression member in association with a rotation operation of the base member and stop movement by the frictional force when the rotation operation of the base member stops.

Supplementary Note 9

The desktop apparatus according to Supplementary note 8, wherein
the support member has a sliding rod that is inserted into a hole provided in the suppression member and that slides through the hole,
an outer diameter of the sliding rod is larger than an inner diameter of the hole in a state in which the sliding rod is not inserted, and the support member moves up and down by sliding the sliding rod through the hole as the base member rotates around the rotation shaft.

Supplementary Note 10

The desktop apparatus according to Supplementary note 9, wherein
the support member further includes an engagement unit that engages with an engagement groove provided in the base member, and
the engagement unit is pressed upward by a lower surface of the engagement groove, whereby the support member moves in an upward direction, and the engagement unit is pressed downward by an upper surface of the engagement groove, whereby the support member moves in a downward direction.

Supplementary Note 11

The desktop apparatus according to Supplementary note 10, wherein the support member is formed in a T-shape, and the sliding rod corresponds to a vertical bar of the T-shape, and the engagement unit corresponds to a horizontal bar of the T-shape.

Supplementary Note 12

The desktop apparatus according to Supplementary note 10 or 11, wherein the engagement unit is formed in a cylindrical shape.

Supplementary Note 13

The desktop apparatus according to any one of Supplementary notes 8 to 12, wherein the suppression member is in contact with the mount member in a region different from a region in which the hole is formed when being viewed from a direction in which the hole is formed.

Supplementary Note 14

The desktop apparatus according to any one of Supplementary notes 8 to 13, wherein, in a portion of the support member that slides through the hole, grooves are formed at equal intervals along a sliding direction of the support member at positions symmetrical to one another when being viewed from an axial direction of the sliding portion.

Supplementary Note 15

A method for assembling an angle adjustment mechanism, comprising: attaching, to a mount member having a rotation shaft rotatably connecting a base member to which a display device is attached, a suppression member configured to suppress up-and-down movement of a support member by frictional force and formed of an elastic member, the support member supporting the base member from below and moving up and down in conjunction with a rotation operation of the base member;
inserting a part of the support member into a hole provided in the suppression member;
assembling the base member to the mount member; and
fixing the display device to the base member.

Although the present invention has been described above with reference to the example embodiment, the present invention is not limited to the above. Various modifications can be made to the structure and details of the present invention which can be understood by a person skilled in the art within the scope of the invention.

This application is based upon and claims the benefit of priority from Japanese patent application No. 2019-166021, filed on Sep. 12, 2019, the disclosure of which is incorporated herein in its entirety by reference.

REFERENCE SIGNS LIST

1 Desktop apparatus
2 Display device
4 Apparatus main body
10 Angle adjustment mechanism
12 Screw
16 Rotation shaft
20 Base member
20a Bearing hole
22 Engagement groove
22a Upper surface
22b Lower surface
24 Guide rib
24a Claw
24b Wall unit
26 Elongated hole
30 Mount member
32 Accommodation unit
32a Groove
32b Hole
34 Guide groove
34a Hole
34b Guide unit
40 Support member
42 Sliding rod
44 Engagement unit
50 Suppression member
52 Hole
54 Protrusion

The invention claimed is:
1. An angle adjustment mechanism comprising:
a base member to which a display device is attached;
a support member configured to support the base member from below and move up and down in conjunction with a rotation operation of the base member;
a mount member having a rotation shaft rotatably connecting the base member; and
a suppression member configured to suppress up-and-down movement of the support member by frictional force, the suppression member being formed of an elastic material and attached to the mount member, wherein
the suppression member is provided with a hole into which a part of the support member is inserted, and the frictional force is generated between the suppression member and the support member in the hole, and
the support member is configured to move up and down by sliding through a hole provided in the suppression member in association with a rotation operation of the base member, and to stop movement by the frictional force when the rotation operation of the base member stops.
2. The angle adjustment mechanism according to claim 1, wherein, in a portion of the support member that slides through the hole, grooves are formed at equal intervals along a sliding direction of the support member, at positions symmetrical to one another when being viewed from an axial direction of the sliding portion.

3. A desktop apparatus comprising:
a display device;
the angle adjustment mechanism according claim 1 configured to adjust an angle of the display device; and
an apparatus main body to which the angle adjustment mechanism is attached via the mount member.

4. The angle adjustment mechanism according to claim 1, wherein the suppression member is in contact with the mount member in a region different from a region in which the hole is formed when being viewed from a direction in which the hole is formed.

5. The angle adjustment mechanism according to claim 4, wherein, in a portion of the support member that slides through the hole, grooves are formed at equal intervals along a sliding direction of the support member, at positions symmetrical to one another when being viewed from an axial direction of the sliding portion.

6. The angle adjustment mechanism according to claim 1, wherein
the support member has a sliding rod that is inserted into a hole provided in the suppression member and that slides through the hole,
an outer diameter of the sliding rod is larger than an inner diameter of the hole in a state in which the sliding rod is not inserted, and
the support member moves up and down by sliding the sliding rod through the hole as the base member rotates around the rotation shaft.

7. The angle adjustment mechanism according to claim 6, wherein the suppression member is in contact with the mount member in a region different from a region in which the hole is formed when being viewed from a direction in which the hole is formed.

8. The angle adjustment mechanism according to claim 6, wherein, in a portion of the support member that slides through the hole, grooves are formed at equal intervals along a sliding direction of the support member, at positions symmetrical to one another when being viewed from an axial direction of the sliding portion.

9. The angle adjustment mechanism according to claim 6, wherein
the support member further includes an engagement unit configured to engage with an engagement groove provided in the base member, and
the engagement unit is pressed upward by a lower surface of the engagement groove, whereby the support member moves in an upward direction, and the engagement unit is pressed downward by an upper surface of the engagement groove, whereby the support member moves in a downward direction.

10. The angle adjustment mechanism according to claim 3, wherein the suppression member is in contact with the mount member in a region different from a region in which the hole is formed when being viewed from a direction in which the hole is formed.

11. The angle adjustment mechanism according to claim 9, wherein, in a portion of the support member that slides through the hole, grooves are formed at equal intervals along a sliding direction of the support member, at positions symmetrical to one another when being viewed from an axial direction of the sliding portion.

12. The angle adjustment mechanism according to claim 9, wherein the engagement unit is formed in a cylindrical shape.

13. The angle adjustment mechanism according to claim 12, wherein the suppression member is in contact with the mount member in a region different from a region in which the hole is formed when being viewed from a direction in which the hole is formed.

14. The angle adjustment mechanism according to claim 12, wherein, in a portion of the support member that slides through the hole, grooves are formed at equal intervals along a sliding direction of the support member, at positions symmetrical to one another when being viewed from an axial direction of the sliding portion.

15. The angle adjustment mechanism according to claim 9, wherein the support member is formed in a T-shape, the sliding rod corresponds to a vertical bar of the T-shape, and the engagement unit corresponds to a horizontal bar of the T-shape.

16. The angle adjustment mechanism according to claim 15, wherein the suppression member is in contact with the mount member in a region different from a region in which the hole is formed when being viewed from a direction in which the hole is formed.

17. The angle adjustment mechanism according to claim 15, wherein, in a portion of the support member that slides through the hole, grooves are formed at equal intervals along a sliding direction of the support member, at positions symmetrical to one another when being viewed from an axial direction of the sliding portion.

18. The angle adjustment mechanism according to claim 15, wherein
the engagement unit is formed in a cylindrical shape.

19. The angle adjustment mechanism according to claim 18, wherein the suppression member is in contact with the mount member in a region different from a region in which the hole is formed when being viewed from a direction in which the hole is formed.

20. A method for assembling an angle adjustment mechanism, comprising:
attaching, to a mount member having a rotation shaft rotatably connecting a base member to which a display device is attached, a suppression member configured to suppress up-and-down movement of a support member by frictional force and formed of an elastic member, the support member supporting the base member from below and moving up and down in conjunction with a rotation operation of the base member;
inserting a part of the support member into a hole provided in the suppression member;
assembling the base member to the mount member; and
fixing the display device to the base member.

* * * * *